United States Patent
Mohrdieck et al.

(10) Patent No.: US 12,062,226 B2
(45) Date of Patent: Aug. 13, 2024

(54) AUTOMATED GENERATION OF TRAINING IMAGES

(71) Applicant: Airbus Defence and Space GmbH, Taufkirchen (DE)

(72) Inventors: Camilla Mohrdieck, Taufkirchen (DE); Michael Wiedmann, Taufkirchen (DE); Reiner Zimmermann, Taufkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 652 days.

(21) Appl. No.: 17/289,649

(22) PCT Filed: Oct. 30, 2019

(86) PCT No.: PCT/EP2019/079629
§ 371 (c)(1),
(2) Date: Apr. 28, 2021

(87) PCT Pub. No.: WO2020/089285
PCT Pub. Date: May 7, 2020

(65) Prior Publication Data
US 2021/0397893 A1 Dec. 23, 2021

(30) Foreign Application Priority Data
Oct. 30, 2018 (EP) .................................... 18203504

(51) Int. Cl.
*G06V 10/774* (2022.01)
*G06F 18/2115* (2023.01)
(Continued)

(52) U.S. Cl.
CPC ........ *G06V 10/774* (2022.01); *G06F 18/2115* (2023.01); *G06F 18/2148* (2023.01); *G06T 7/11* (2017.01); *G06V 20/13* (2022.01)

(58) Field of Classification Search
CPC ...... G06V 20/13; G06V 20/58; G06V 10/774; G06T 7/11; G06F 18/2115; G06F 18/2148
See application file for complete search history.

(56) References Cited

U.S. PATENT DOCUMENTS

| | | | |
|---|---|---|---|
| 8,411,969 B1 | 4/2013 | Joslin et al. | |
| 2017/0236013 A1 | 8/2017 | Clayton et al. | |
| 2017/0323154 A1* | 11/2017 | Kollmann | G06V 20/59 |

FOREIGN PATENT DOCUMENTS

| | | |
|---|---|---|
| CN | 106816038 A | 6/2017 |
| CN | 108254741 A | 7/2018 |

(Continued)

OTHER PUBLICATIONS

International Search Report; priority document.
European Search Report; priority document.

*Primary Examiner* — Daniel G Mariam
(74) *Attorney, Agent, or Firm* — Greer, Burns & Crain, Ltd.

(57) ABSTRACT

A method for providing training images including receiving information about objects which is at least valid at a specific recording time. The method includes receiving an image of an area imaged at the specific recording time. The method includes estimating respective positions of the objects at the specific recording time based on the information and selecting estimated positions of respective objects from the estimated respective positions which fulfill a predefined selection criterion. The method includes generating training images by separating the imaged area into first and second pluralities of image tiles. Each of the first plurality of image tiles differs from each of the second plurality of image tiles. Each of the first plurality of image tiles images (depicts) a respective one or several of the selected positions. The method includes providing the training images. Further, a (Continued)

training image product and a device for providing training images are provided.

15 Claims, 7 Drawing Sheets

(51) Int. Cl.
*G06F 18/214* (2023.01)
*G06T 7/11* (2017.01)
*G06V 20/13* (2022.01)

(56) References Cited

FOREIGN PATENT DOCUMENTS

| | | |
|---|---|---|
| CN | 108416361 A | 8/2018 |
| EP | 2610636 A1 | 7/2013 |

* cited by examiner

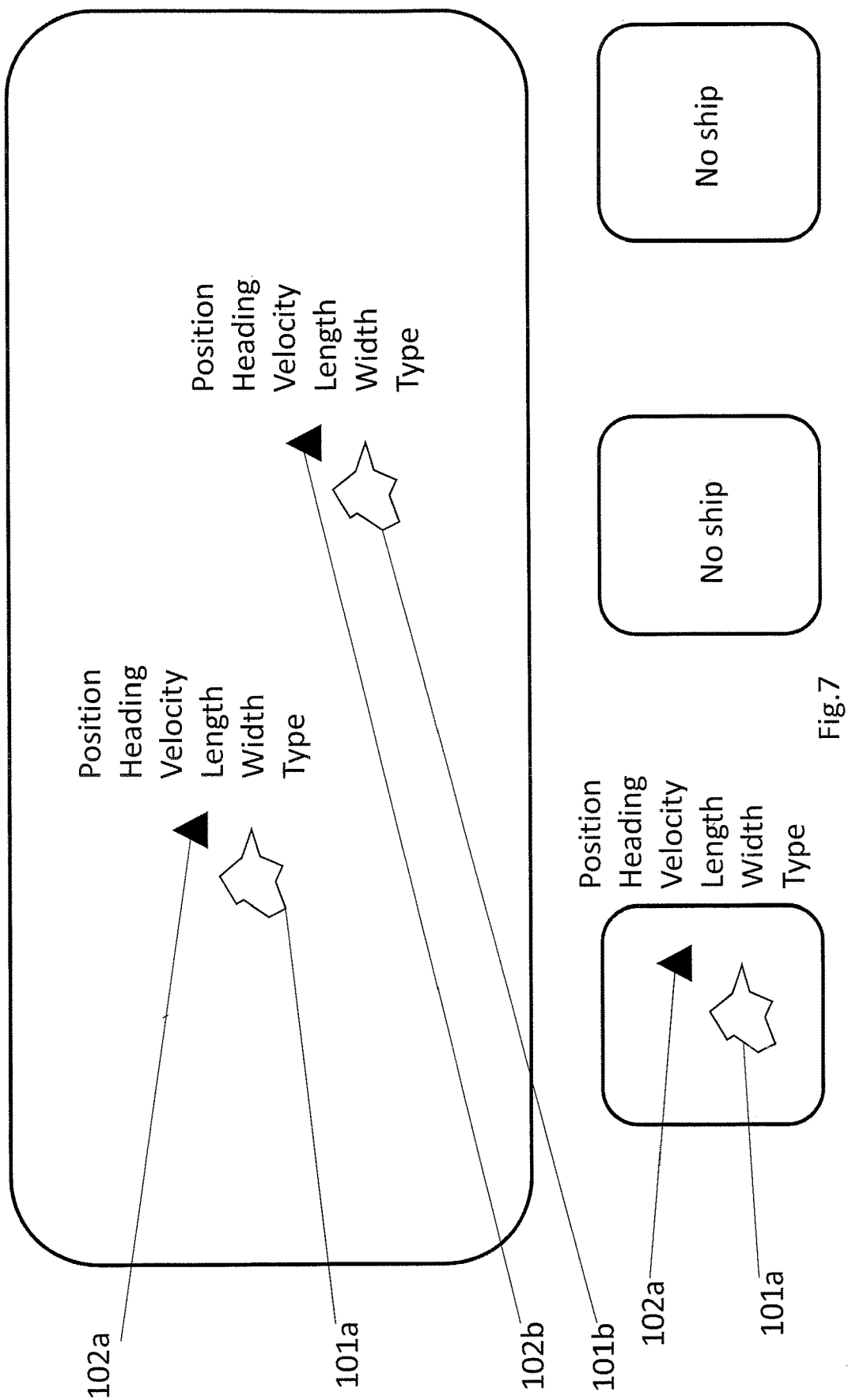

AUTOMATED GENERATION OF TRAINING IMAGES

CROSS-REFERENCES TO RELATED APPLICATIONS

This application claims the benefit of the International Application No. PCT/EP2019/079629, filed on Oct. 30, 2019, and of the European patent application No. 18203504.8 filed on Oct. 30, 2018, the entire disclosures of which are incorporated herein by way of reference.

FIELD OF THE INVENTION

Examples relate to concepts for generating training images automatically and applications thereof and, in particular, to a method and device for providing training images.

BACKGROUND OF THE INVENTION

Automatic target recognition (i.e., automatic detection and identification of an object of interest) is a capability of paramount importance in modern surveillance systems, as well as in services such as the delivery of imagery products from airborne or spaceborne sensors. Modern image analysis systems apply machine learning techniques, especially deep neural networks, to perform this task efficiently and effectively. However, these techniques generally require large volumes of labelled images that serve as input to train a machine learning tool to be able to associate a detected object of interest with correct labels fully autonomously.

Today, the generation of training images is performed under use of manual or semi-automatic processes that involve an operator in the loop. This is a time-consuming task.

Procedures may have to be optimized with respect to the overall data processing time and data latency. Therefore, it is desired to form a system with a reduced data processing time.

There may be a demand to provide concepts for a method with a lower time consumption.

Such a demand may be satisfied by the subject-matter of the claims.

SUMMARY OF THE INVENTION

In particular, the present disclosure provides a procedure to automatically generate training images that may be an input for a subsequent training of a machine learning tool which is used for detecting and identifying objects of interest in images autonomously.

According to a first aspect, a method for providing training images is provided. The method comprises receiving information about objects. The information is at least valid at a specific recording time. The method comprises receiving an image of an area. The area may be imaged (recorded) at the specific recording time. The method comprises estimating respective positions of the objects at the specific recording time based on the information. The method comprises selecting estimated positions of respective objects from the estimated respective positions which fulfil a predefined selection criterion. The method comprises generating training images by separating the imaged area (i.e., the image of the area) into a first plurality of image tiles and a second plurality of image tiles. Each of the first plurality of image tiles differs from each of the second plurality of image tiles. Each of the first plurality of image tiles images (depicts) a respective one or several of the selected positions. The method comprises providing the training images.

Accordingly, an operator in the loop may not be needed. Thus, the method may be less time-consuming.

Further, the provision of good training images (first plurality of image tiles) and bad images (second plurality of image tiles) may be very effective because of the selection criterion. Thus, the method may not only be efficient, but also effective.

Further positive effects are considered for a range of surveillance applications, e.g., it may be easier to repeat or extend the training of one or several machine learning tools. For example, it may accelerate the throughput of aerial or satellite imagery from the acquisition of the image to the delivery of the final analyzed product.

The positions of the objects to be estimated may be within the area at the specific recording time.

The area may be a section of an earth surface. Thus, the images may be related to sections of the earth surface.

Further, the specific recording time may be in the past. For example, the specific recording time may be in the past, when receiving the image of the area. Thus, the step of receiving may be performed after the step of imaging.

Each of the first plurality of image tiles may image one or several of the selected positions.

Further, a plurality of images may be received and the method may comprise corresponding method steps for processing the plurality of images as described in the first aspect.

The image or the plurality of images may be received from a database, an archive or any earth observation image repository.

The objects (of interest) may be expected to be within the area at the specific recording time.

The predefined selection criterion is related to an error probability.

The image tiles of the second plurality may differ among each other.

The image tiles of the first plurality may differ among each other.

The provision of the training images may be in the form of training data.

The training data can be a compressed and/or encoded form of data for (use in) transfer/transmission. The training data may be provided to a machine learning tool. The machine learning tool can make use of the training data as learning input.

The method may be performed fully autonomously and automatically.

The objects may be objects of interest. These objects may be aircraft or ships in the area. The area may be or be part of a maritime surveillance area.

The information may comprise time dependent information about the objects. The information may comprise time independent information about the objects. The information may be transmitted by the objects. The information may also be a combined information of different information sources. The information can include information about georeferencing. Thus, the imaged area may be aligned by using georeferencing. The information about georeferencing may be in the form of a georeferenced image. Thus, the method may further include aligning the estimated or selected positions on the imaged area based on the information. The information may comprise information about geographic coordinates. The geographic coordinates may be used for georeferencing. Thus, the method may further comprise georeferencing the imaged area according to the information about the geographic coordinates. Consequently, the imaged area may be (correctly) aligned to respective coordinates of the objects and/or respective tracks of the objects (at the specific recording time). The coordinates/tracks of the objects may (already) be georeferenced. Thus, the respective coordinates/tracks of the objects may be georeferenced coordinates/tracks.

According to an example, a computer program product is provided. The computer program product may comprise program code portions for carrying out a method according to the first aspect when the computer program product is executed on one or more processing units.

The computer program product may be stored on one or more computer-readable storage media.

The information may be a supportive information. The supportive information can comprise Automatic Identification System for Ships (AIS) messages. These messages may be transmitted by the objects. In the case of AIS messages, the objects may be vessels. Further, the supportive information can comprise information retrieved from a database having information about the objects. Further, the supportive information can comprise open source information about the objects. The supportive information can also comprise Automatic Dependent Surveillance-Broadcast (ADS-B) messages. These messages may also be transmitted by the objects. In the case of ADS-B messages, the objects may be aircraft.

The step of estimating may be performed after the specific recording time. The estimated positions may relate to the positions at the specific recording time. In other words, the estimated positions may be associated with the specific recording time. The exact positions may not be necessary for the step of estimating and the later step of separating, because the training images may just be established with the use of the estimations and not with the exact positions. Thus, the method may not need to make use of the image properties itself. Consequently, the method provides an effective tool for a machine learning algorithm using the provided training images without the need for an operator in the loop. There may be no consistency check since the supportive information provides for an efficient and effective estimation of the positions of the objects.

After the step of estimating, the step of selecting may be performed. The criterion used for selecting good training images may be related to an error probability for the good training images to meet the predefined selection criterion. The predefined selection criterion may be construed with a predefined quality criterion related to a quality (of the content) of the image. Thus, the step of selecting may comprise determining if uncertainties in each of the respective estimated positions exceed a threshold. The threshold may be related to a desired error probability. Thus, a decision can be made autonomously without the need for an operator in the loop.

After the step of selecting, the step of labelling may be performed. The step of labelling may only be performed for the first plurality of image tiles. The imaged area may be labelled with the estimated positions of the objects. Further, the image may be labelled with respective attributes (properties) of the objects. The step of labelling may include labelling the imaged area with the information that the objects are inside a footprint (a radar or optical footprint) of the imaging unit. The footprint may be the area as described herein. Further, the step of labelling may include labelling the imaged area with information about the estimated positions of the objects. Further, the step of labelling may include labelling the imaged area with information about heading, course, speed, length, width, type and/or corresponding uncertainties of each of the objects. The labelling may depend on the amount of information which is supported by the supportive information or on the connectivity to the objects' database(s).

The step of labelling may comprise labelling the image (imaged area) with main properties of each of the objects. The main properties/attributes may be position, heading, velocity, dimensions, type of the object and (if known or available) respective uncertainties in the properties' values. Thus, the provided training images may be more precise in terms of content. Machine learning can therefore be improved substantially.

The step of labelling may also be performed for the second plurality of image tiles. The imaged area may be labelled with features of this area.

The features may comprise characteristics of the image tiles' backgrounds. Examples of backgrounds may comprise open water, water and coastlines, ice-infested waters, harbor areas, water and off-shore structures, polluted waters. Respective characteristics may be different sea states, different shapes of coastlines, different ice conditions. The labelling may depend on the amount of information which is supported by the supportive information.

After labelling, the step of generating training images may be performed. For the step of generating training images, parts of the imaged area may be separated (cut out). These parts may contain (the information about) the respective estimated positions of the objects. These parts may be the image tiles of the first plurality of image tiles. The first plurality of image tiles may be associated with a positive characteristic, such as "good training image". The first plurality of image tiles may be provided to the machine learning tool. The first plurality of image tiles may further provide for the information that the objects are present in the first image tile. The second plurality of image tiles may also provide for the information that no objects of interest are present in each of the second plurality of image tiles. The number and size of image tiles of the imaged area may be adjustable. The dimension of the image tiles of the first plurality may depend on the size of the objects. The dimension may be a diagonal of the respective image tile. Further the dimension may also be a length or a width of the respective image tile. The image tile may be substantially rectangular or quadratic.

The step of estimating may comprise estimating positions of the objects (of interest) which are expected to be present at the time, or time period, of the specific recording time. The supportive information used for the step of estimating may comprise a (single) parametric estimation model for one (or each) of the objects. The parametric estimation model may provide variances of the estimated positions of the respective objects. The supportive information may be used for the step of estimating in that the respective objects' time dependent attributes like speed, course, etc., can be estimated for the specific recording time. Further, the supportive information may be used for the step of estimating in that the respective objects' time independent attributes like length, width and type can be estimated.

Before the step of labelling, a step of selecting may be performed. The step of selecting may be performed automatically after the step of estimating. The step of selecting may be performed by a processing unit. The step of selecting may comprise deciding/determining which of the estimated positions of respective objects are used in the step of generating the training images. Thus, estimated positions of respective objects which do not fulfill a predefined requirement may be discarded and not used in the step of generating the training images. The step of deciding may comprise deciding whether the accuracies of the estimated positions of respective objects exceed a threshold that may be related to a predefined error probability. This may be performed for each of the estimated positions of respective objects and their accuracies, respectively.

The image tiles of the second plurality of image tiles may image a part of the imaged area that does not contain any object of interest.

According to an example, a set of training images is provided. The images for the set of training images may be provided by a method according to the first aspect. The set of training images may be used to train a machine learning tool or a machine learning image analysis system. The machine learning tool or the machine learning image analysis system may then be enabled to make use of the provided training images. Further, the machine learning tool or the machine learning image analysis system may be enabled to perform (deep) learning based on the set of training images.

According to a second aspect, a training image product is provided. The training image product serves as input to train machine learning for an image analysis system. The training image product comprises the training images provided by the method according to the first aspect.

The training images may be separated into a first plurality of image tiles and a second plurality of image tiles. Each of the first plurality of image tiles may comprise a respective state vector. Components of the respective state vectors may be associated with an object to be present in the respective image tile. Further, each of the first plurality of image tiles may be labelled with the information that an object (of interest) is present in the respective image tile. These images may be referred to as "good training images".

Each of the second plurality of image tiles may be labelled with the information that no object is present in the respective image tile. These images may be referred to as "bad training images".

According to a third aspect, a device for providing training images is provided. The device comprises a first receiving unit adapted to receive information about objects. The information is at least valid at a specific recording time. The device comprises a second receiving unit. The second receiving unit is adapted to receive an image of an area. The area is imaged (recorded) at the specific recording time. The device comprises a processing unit adapted to estimate respective positions of the objects at the specific recording time based on the information. The processing unit is further adapted to select estimated positions of respective objects from the estimated respective positions which fulfill a predefined selection criterion. The processing unit is further adapted to generate training images by separating the imaged area (i.e., the image of the area) into a first plurality of image tiles and a second plurality of image tiles. Each of the first plurality of image tiles differs from each of the second plurality of image tiles. Each of the first plurality of image tiles images a respective one or several of the selected positions. The device comprises a transmitting unit adapted to provide the training images.

The device may be (adapted) for use in an aircraft or a satellite.

The first receiving unit may be a receiving unit. The second receiving unit may be another receiving unit. The first and second receiving units may be the receiving unit or form part of the receiving unit. The other receiving unit may be in the form of an interface or is an interface. The other receiving unit may, for example, engage with the receiving unit such that they form a single interface. For example, the receiving unit and the other receiving unit are a single unit or separate from each other.

The device may be (at least partly) arranged or arrangeable on board a means of transport, such as an aircraft or satellite. The device may be used/useable or operated/operable during a flight phase of the means of transport.

The elements of the device may be interconnected with each other or with any combination in between. For example, the first receiving unit may be connected to the processing unit. Further the processing unit may be connected to the second receiving unit. Further, the processing unit may be connected to the transmitting unit. Further the processing unit and the transmitting unit may be a single unit. Further, the receiving unit and the processing unit may be integrated in a single device. Moreover, the processing unit, the receiving unit and the transmitting unit may be integrated into a single module or each can be a single module being able to be put together to one single module.

The images may be made by an imaging sensor. The imaging sensor may be an optical sensor or a radar sensor. The images may be directly transferred from the imaging sensor to the device (received by the second receiving unit), or they may be ingested into the device from a data center and/or an archive and/or a database.

The specific recording time may be an image acquisition time necessary for imaging. The specific recording time may differ between an optical sensor and a radar sensor to be used as imaging unit.

According to an example, a system for providing training images may be provided. The system may comprise a receiving unit adapted to receive information about objects. The information may be at least valid at a specific recording time. The system may comprise an imaging unit. The imaging unit may be adapted to image an area at the specific recording time. The system may comprise a processing unit adapted to estimate respective positions of the objects at the specific recording time based on the information. The step of estimation may be performed after the step of imaging. The processing unit may be further adapted to select estimated positions of respective objects from the estimated respective positions which fulfill a predefined selection criterion. The processing unit may be further adapted to generate training images by separating the imaged area into a first plurality of image tiles and a second plurality of image tiles. Each of the first plurality of image tiles may differ from each of the second plurality of image tiles. Each of the first plurality of image tiles may image a respective one or several of the selected positions. The device may comprise a transmitting unit adapted to provide the training images.

The specific recording time may be a time duration (in the past).

According to a fourth aspect, a method for providing training images is provided. The method comprises receiving information about objects. The information is at least valid at a specific recording time. The method comprises receiving an image of an area. The area may be imaged (recorded) at the specific recording time. The method comprises estimating respective positions of the objects at the specific recording time based on the information. The method comprises selecting estimated positions of respective objects from the estimated respective positions which fulfill a predefined selection criterion. The method comprises providing training images.

The method may comprise generating the training images based on the imaged area, i.e., based on the image of the area. The term "generating the training images based on the imaged area"/"generating the training images based on the image of the area" may be understood as generating the training images (i) based on only the imaged area and/or (ii) based on the imaged area and one or more image tiles and/or (iii) based on only one or more image tiles. The one or more image tiles may be derived from the imaged area.

For example, the one or more image tiles may be derived from the imaged area by separating the imaged area into a first plurality of image tiles and a second plurality of image tiles. That is, the one or more image tiles may correspond to or comprise the first plurality of image tiles and the second plurality of image tiles. Each of the first plurality of image tiles may differ from each of the second plurality of image tiles. Each of the first plurality of image tiles may image (depict) a respective one or several of the selected positions.

The details set forth above with respect to the method according to the first aspect equally apply also, when suitable, to the method according to the fourth aspect.

According to a fifth aspect, a device for providing training images is provided. The device comprises a first receiving unit adapted to receive information about objects. The information is at least valid at a specific recording time. The device comprises a second receiving unit. The second receiving unit is adapted to receive an image of an area. The area is imaged (recorded) at the specific recording time. The device comprises a processing unit adapted to estimate respective positions of the objects at the specific recording time based on the information. The processing unit is further adapted to select estimated positions of respective objects from the estimated respective positions which fulfill a predefined selection criterion. The device comprises a transmitting unit adapted to provide training images.

The processing unit may be configured to generate the training images based on the imaged area, i.e., based on the image of the area. As set forth above, the term "generating the training images based on the imaged area"/"generating the training images based on the image of the area" may be understood as generating the training images (i) based on only the imaged area and/or (ii) based on the imaged area and one or more image tiles and/or (iii) based on only one or more image tiles. The one or more image tiles may be derived from the imaged area.

For example, the processing unit may be adapted to generate training images by separating the imaged area (i.e., the image of the area) into a first plurality of image tiles and a second plurality of image tiles. That is, the one or more image tiles may correspond to or comprise the first plurality of image tiles and the second plurality of image tiles. Each of the first plurality of image tiles may differ from each of the second plurality of image tiles. Each of the first plurality of image tiles may image (depict) a respective one or several of the selected positions.

The details set forth above with respect to the device according to the third aspect equally apply also, when suitable, to the device according to the fifth aspect.

It is clear to a person skilled in the art that the statements set forth herein under use of hardware circuits, software means or a combination thereof may be implemented. The software means can be related to programmed microprocessors or a general computer, an ASIC (Application Specific Integrated Circuit) and/or DSPs (Digital Signal Processors). For example, the imaging unit, the processing unit, the first receiving unit, the second receiving unit, and the transmitting unit may be implemented partially as a computer, a logical circuit, an FPGA (Field Programmable Gate Array), a processor (for example, a microprocessor, microcontroller (μC) or an array processor)/a core/a CPU (Central Processing Unit), an FPU (Floating Point Unit), NPU (Numeric Processing Unit), an ALU (Arithmetic Logical Unit), a Coprocessor (further microprocessor for supporting a main processor (CPU)), a GPGPU (General Purpose Computation on Graphics Processing Unit), a multi-core processor (for parallel computing, such as simultaneously performing arithmetic operations on multiple main processor(s) and/or graphical processor(s)) or a DSP. It is further clear to the person skilled in the art that even if the herein-described details will be described in terms of a method, these details may also be implemented or realized in a suitable device, a computer processor or a memory connected to a processor, wherein the memory can be provided with one or more programs that perform the method, when executed by the processor. Therefore, methods like swapping and paging can be deployed.

Even if some of the aspects described above have been described in reference to the method, these aspects may also apply to the device, the system, the training image product, the set of training images and to the computer program product. Likewise, the aspects described above in relation to the device may be applicable in a corresponding manner to the method, the system, the training image product, the set of training images and to the computer program product. Moreover, the aspects described above in relation to the system may be applicable in a corresponding manner to the method, the device, the training image product, the set of training images and to the computer program product. Further, the aspects described above in relation to the training image product may be applicable in a corresponding manner to the method, the device, the system, the set of training images and to the computer program product. Furthermore, the aspects described above in relation to the set of training images may be applicable in a corresponding manner to the method, the device, the system, the training image product and to the computer program product.

It is also to be understood that the terms used herein are for purpose of describing individual embodiments and are not intended to be limiting. Unless otherwise defined, all technical and scientific terms used herein have the meaning which corresponds to the general understanding of the skilled person in the relevant technical field of the present disclosure; they are to be understood as neither too broad nor too narrow. If technical terms are used incorrectly in the present disclosure, and thus do not reflect the technical concept of the present disclosure, these should be replaced by technical terms which convey a correct understanding to the skilled person in the relevant technical field of the present disclosure. The general terms used herein are to be construed based on the definition in the lexicon or the context. A too narrow interpretation should be avoided.

It is to be understood that terms such as e.g., "comprising" "including" or "having", etc., mean the presence of the described features, numbers, operations, acts, components, parts, or combinations thereof, and do not exclude the presence or possible addition of one or more further features, numbers, operations, acts, components, parts or their combinations.

Although terms like "first" or "second", etc., may be used to describe different components or features, these components or features are not to be limited to these terms. With the above terms, only one component is to be distinguished from the other. For example, a first component may be referred to as a second component without departing from the scope of the present disclosure; and a second component may also be referred to as a first component. The term "and/or" includes both combinations of the plurality of related features, as well as any feature of that plurality of the described plurality of features.

In the present case, if a component is "connected to", "in communication with" or "accesses" another component, this may mean that it is directly connected to or directly accesses the other component; however, it should be noted that another component may be therebetween. If, on the other hand, a component is "directly connected" to another component or "directly accesses" the other component, it is to be understood that no further components are present therebetween.

In the following, the preferred embodiments of the present disclosure will be described with reference to the accompanying drawings; the same components are always provided with the same reference symbols.

In the description of the present disclosure, detailed explanations of known connected functions or constructions are omitted, insofar as they are unnecessarily distracting from the present disclosure; such functions and constructions are, however, understandable to the skilled person in the technical field of the present disclosure. The accompanying drawings are illustrative of the present disclosure and are not to be construed as a limitation. The technical idea of the present disclosure is to be construed as comprising, in addition to the accompanying drawings, all such modifications, variations and variants.

BRIEF DESCRIPTION OF THE DRAWINGS

Other objects, features, advantages and applications will become apparent from the following description of non-limiting embodiments regarding the accompanying drawings. In the drawings, all described and/or illustrated features, alone or in any combination form the subject matter disclosed therein, irrespective of their grouping in the claims or their relations/references. The dimensions and proportions of components or parts shown in the figures are not necessarily to scale; these dimensions and proportions may differ from illustrations in the figures and implemented embodiments.

FIG. 7 schematically illustrates a radar image showing a first detected vessel 101a and its estimated position 102a and a second detected vessel 101b and its estimated position 102b, wherein the labels signify the vessels' properties at the time of the acquisition of the images.

DETAILED DESCRIPTION OF THE PREFERRED EMBODIMENTS

Figure 1:
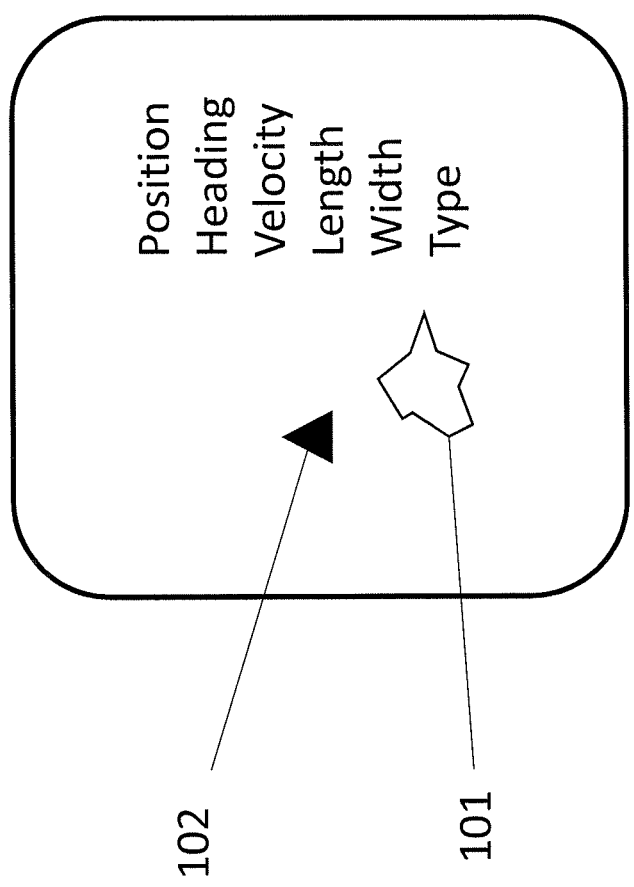
FIG. 1 schematically illustrates a radar image showing a detected vessel 101 and its estimated position 102, wherein the labels signify the vessel's properties at the time of the acquisition of the image.

The variants of the functional and operational aspects as well as their functional and operational aspects described herein are only for a better understanding of its structure, its functions and properties; they do not limit the disclosure to the embodiments. The figures are partially schematic, said essential properties and effects are clearly shown enlarged or scaled down in part to clarify the functions, active principles, embodiments and technical characteristics. Every operation, every principle, every technical aspect and every feature that/which is disclosed in the figures or in the text is/can be combined with all claims, each feature in the text and the other figures, other modes of operation, principles, technical refinements and features that are included in this disclosure, or result from it, so that all possible combinations are assigned to the devices and methods described. They also include combinations of all individual comments in the text, that is, in each section of the description, in the claims and combinations between different variations in the text, in the claims and in the figures, and can be made to subject-matter of further claims. The claims do not limit the disclosure and therefore the possible combinations of all identified characteristics among themselves. All features disclosed are explicitly also individually and in combination with all other features disclosed herein.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e., only A, only B as well as A and B. An alternative wording for the same combinations is "at least one of A and B". The same applies for combinations of more than 2 elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Further, while the embodiments are mainly described with reference to the generation of training images based on (only) one or more image tiles derived from an imaged area, it is equally conceivable that the training images are generated (i) based on only the imaged area and/or (ii) based on the imaged area and one or more image tiles derived from the imaged area.

The method and the device will now be described with respect to the embodiments.

In the following, without being restricted thereto, specific details are set forth to provide a thorough understanding of the present disclosure. However, it is clear to the skilled person that the present disclosure may be used in other embodiments, which may differ from the details set out below.

FIG. 1 schematically illustrates a radar image representing a detected vessel 101 and its estimated position 102, wherein the labels signify the vessel's properties at the time of the acquisition of the image.

Given a radar or optical image, the footprint of the imaging sensor and the image acquisition time, the present disclosure aims at predicting which objects are detected in that image, where on the image they are detected and what their main properties are at the time of their detection, i.e., at the time of the acquisition of the image. For that, the present disclosure makes use of existing supportive information about an object of interest, for example a vessel that is to be detected and recognized in the image. This information may include Automatic Identification System for ships (AIS) messages transmitted by the vessel and additional information retrieved from vessel databases and open source information. The combined vessel information is used to estimate, as precisely as possible, the position of the vessel at the time of the acquisition of the satellite image. Subsequently, the image is labeled with the estimated position and with the vessel's main attributes. For example, as a minimum, the labelling includes the information that a) a vessel is inside the imaging sensor's footprint and b) it is at the estimated position. Depending on the content of the supportive information, additional labels can include the vessel's heading, course, speed, length, width, type and corresponding uncertainties in values of these properties. A schematic example of a labeled image is shown in FIG. 1.

More details and aspects are mentioned in connection with the embodiments described above or below. The embodiment shown in FIG. 1 may comprise one or more optional additional features corresponding to one or more aspects mentioned in connection with the proposed concept or one or more embodiments described below (e.g., FIGS. 2-5).

Figure 2:
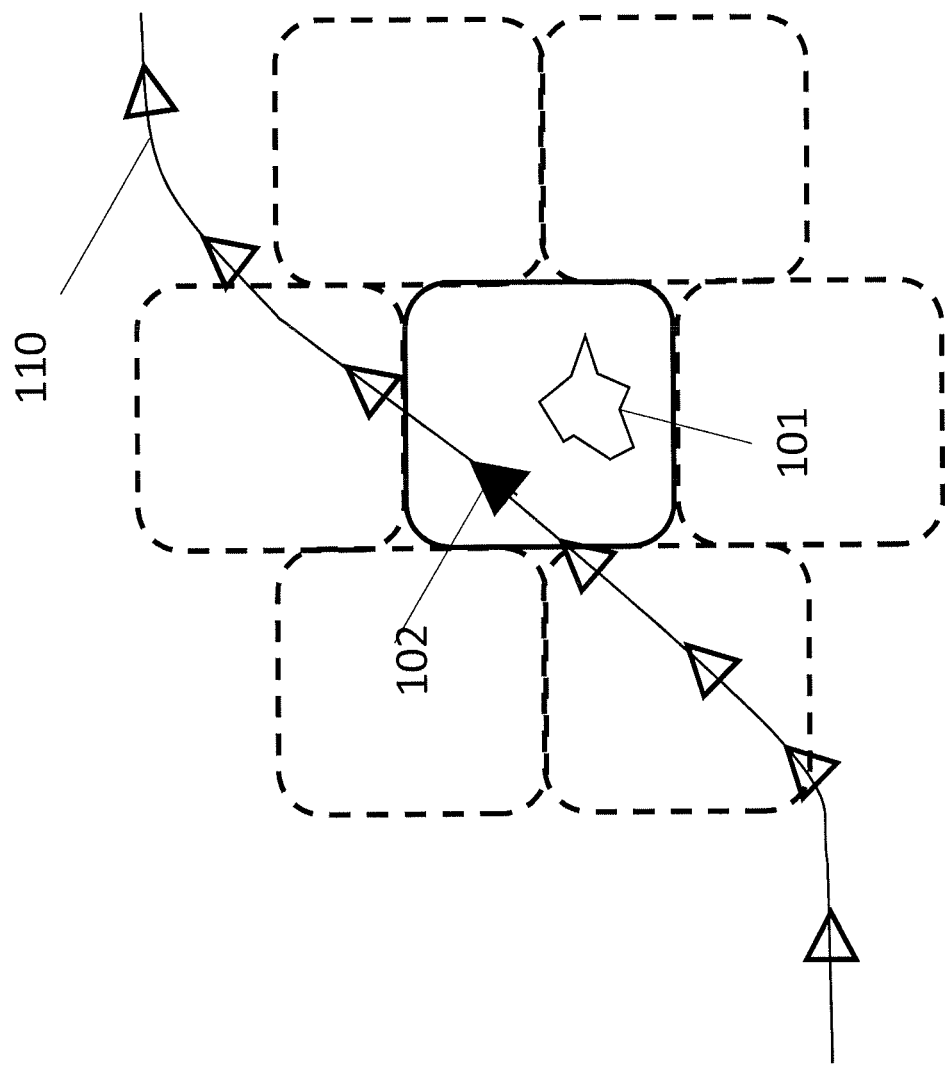
FIG. 2 schematically illustrates an image section with triangles along an AIS track of a vessel and a black triangle 102 which represents an estimated vessel position at the time of the acquisition of the image which is expected to show the vessel 101.

FIG. 2 schematically illustrates an image section with triangles along an AIS track of a vessel and a black triangle 102 which represents an estimated vessel position at the time of the acquisition of the image which is expected to show the vessel 101.

After labelling, a part of the image that contains the estimated position of the vessel (black triangle 102 in FIG. 2) is cut out of the image (the tile with the solid line frame in FIG. 2). This tile is provided to a machine learning tool as a "good training image". This means that it is expected to show a vessel with the labeled properties. Analogously, surrounding areas of this tile that are not expected to contain vessels are defined and clipped (the tiles with dashed line frames in FIG. 2). These parts of the image are presented to the machine learning tool as "bad training images" that are not expected to show a vessel. The sizes of the good and bad training images can be different and/or variable, respectively. Further the sizes can depend on the vessel size, on potential customer requirements as well as on potential requirements related to the machine learning tool.

In this way, good training image(s) (solid line frame in FIG. 2) and bad training image(s) (dashed line frames in FIG. 2) can be generated fully automatically and can be used to train deep learning algorithms. Once the algorithm is trained, it can detect vessels and extract their main attributes and corresponding uncertainties autonomously, for example in radar and optical images.

More details and aspects are mentioned in connection with the embodiments described above or below. The embodiment shown in FIG. 2 may comprise one or more optional additional features corresponding to one or more aspects mentioned in connection with the proposed concept or one or more embodiments described above (e.g., FIG. 1) or below (e.g., FIGS. 3-5).

Figure 3:
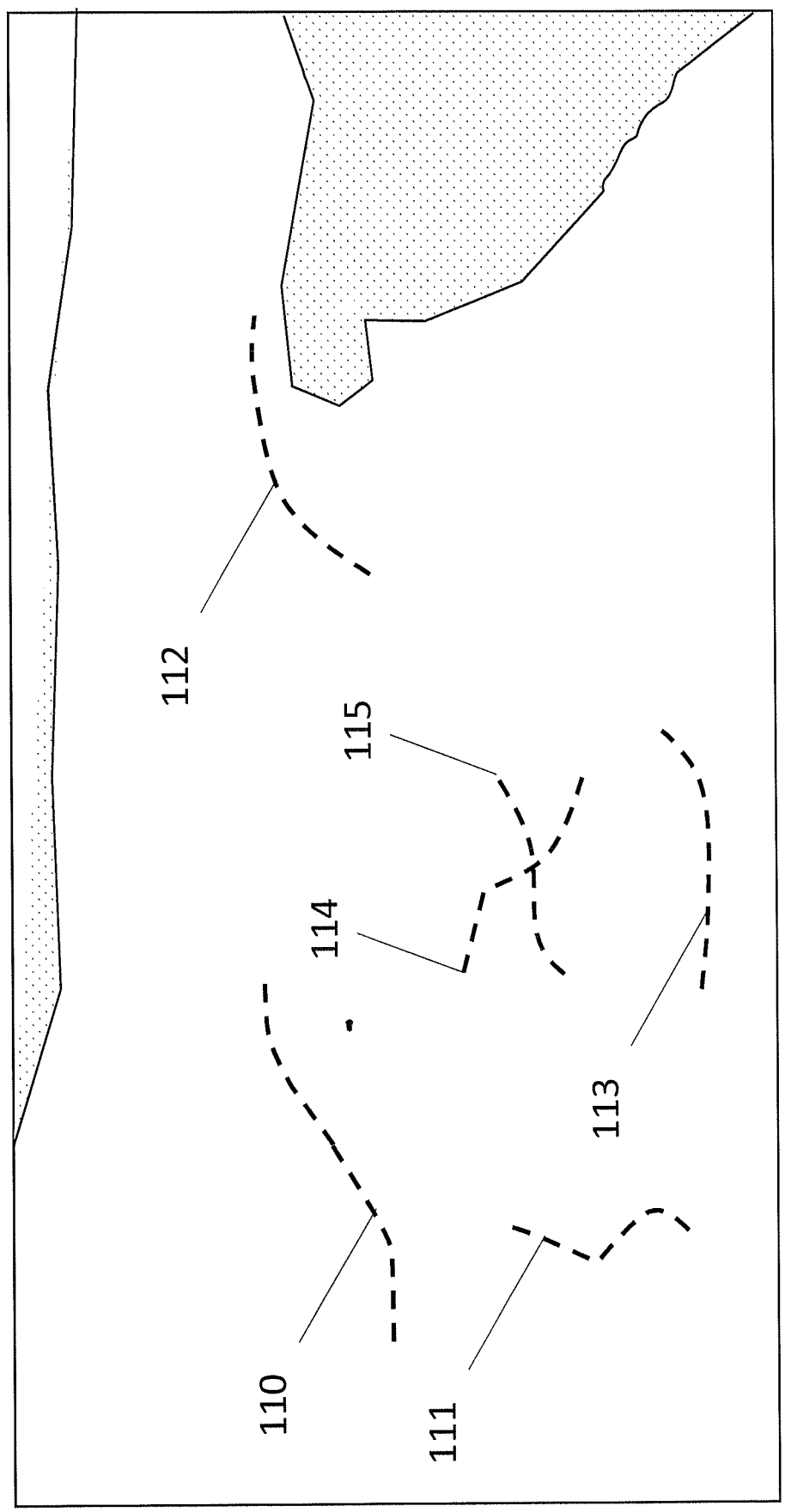
FIG. 3 schematically illustrates a Satellite SAR image with ship detections (not visible) and overlaid coincident AIS ship tracks (black polygons)

FIG. 3 schematically illustrates a Satellite SAR image with ship detections (not visible) and overlaid coincident AIS ship tracks (black polygons).

To realize the described approach as outlined above, a mechanism of 4 basic steps can be performed. These 4 basic steps may render the method efficient and effective.

These 4 steps are as follows:

Estimation of Positions, Attributes and Uncertainties

Step 1 comprises the estimation of the positions of all objects of interest that are expected to be present in the image at the time of the image acquisition with the help of supportive information and a parametric estimation model that allows evaluating variances of the position estimates. In addition, the supportive information (e.g., existing kinematic models) can be used to estimate time-dependent properties of the objects (e.g., speed, course, etc.) at the time of the image acquisition including uncertainties in the estimated values. The supportive information can also be used to extract time-independent object attributes (e.g., length, width, type) and to estimate their uncertainties. The estimated and extracted positions, attributes and uncertainties constitute the potential labels with which the image is to be marked.

Selection of Labels

Step 2 comprises a selection process. The selection process is an automated mechanism to decide which estimates are discarded and which ones are selected for the subsequent labelling procedure based on the estimated position uncertainties. The selection process considers requirements and boundary conditions related to the training images. This ensures that a configurable percentage of the generated training images are of sufficiently high quality with pre-defined high confidence (i.e., with pre-defined small error probability). This further ensures that the training procedure is successful and efficient.

Labelling

Step 3 comprises the step of labelling. This step comprises mapping the estimated positions and the attributes and their corresponding uncertainties onto the image that is expected to show the objects. For example, a potential Doppler shift of a moving object and particulars of geometric projections that are used to display detected objects in images are considered therein.

Tiling

Step 4 comprises clipping tiles of various sizes that are either labeled with the objects' properties, or that are labeled with the information that there is no object of interest inside the tile. The clipped tiles constitute the good and bad training images, respectively. The tiling algorithm may adapt the tile sizes automatically according to the estimated dimensions of the object of interest and to requirements relating to the generalization capabilities of the machine learning tool to be trained.

Input data of the mechanism/method may be the following: a georeferenced image, the acquisition time of the image and/or coincident supportive information on the objects of interest that are expected to be present in the image. An exemplary scenario is illustrated therefor in FIG. 3. This can be an example of a synthetic aperture radar (SAR) satellite image showing coastal waters, ships (not illustrated) and overlaid time-coincident AIS tracks of ships (110, 111, 112, 113, 114 and 115).

Figure 4:
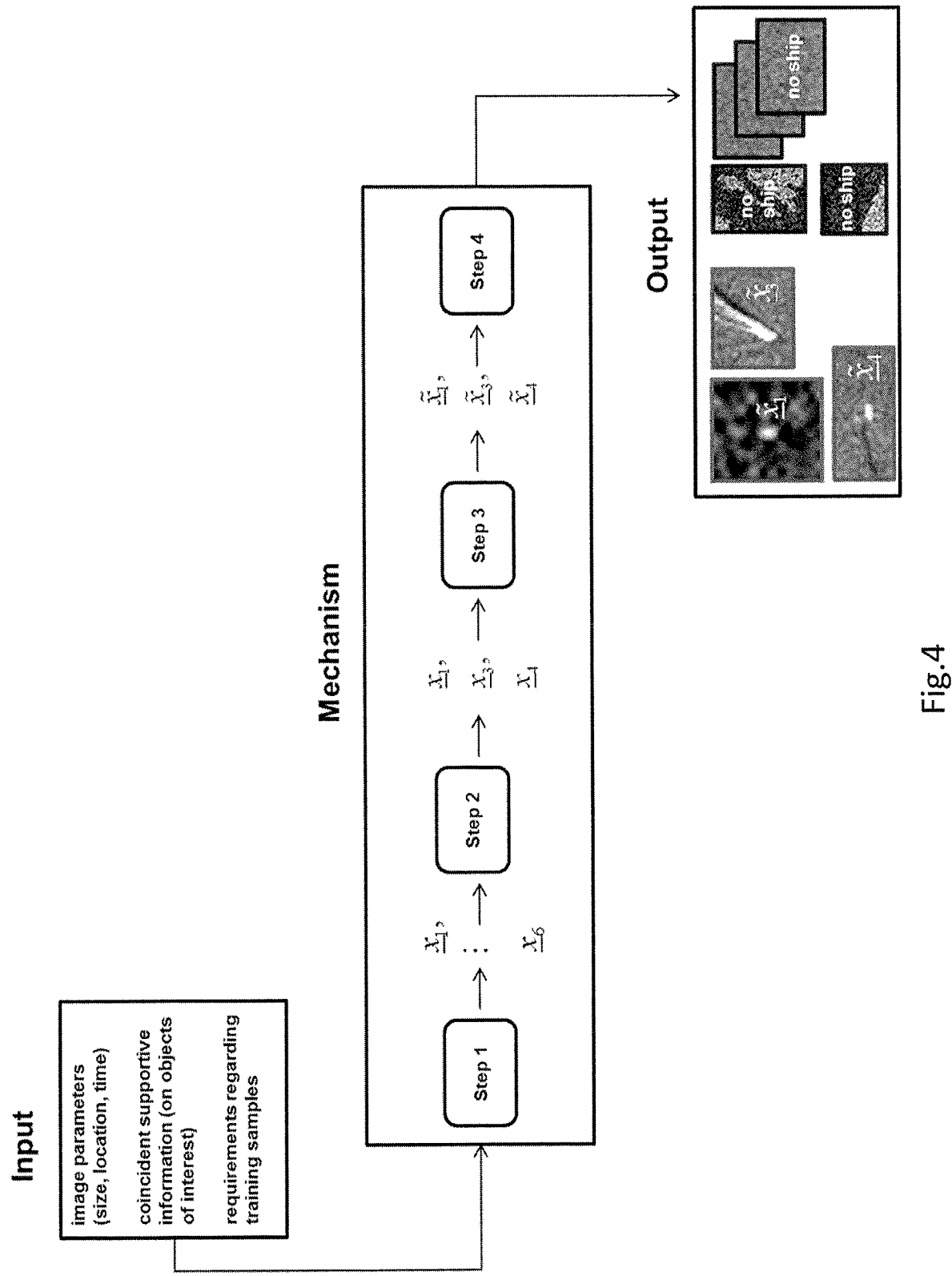
FIG. 4 schematically illustrates a flow chart with input, mechanism and output.

For those vessels for which there exist unique AIS tracks (110, 111, 112, 113, 114 and 115) that are in the imaging sensor's field of view at the image acquisition time, the sequential step-wise mechanism is outlined in FIG. 4.

More details and aspects are mentioned in connection with the embodiments described above or below. The embodiment shown in FIG. 3 may comprise one or more optional additional features corresponding to one or more aspects mentioned in connection with the proposed concept or one or more embodiments described above (e.g., FIGS. 1-2) or below (e.g., FIGS. 4-5).

FIG. 4 schematically illustrates a flow chart with input, mechanism and output.

The input data is processed in step 1 to provide estimated state vectors $x_i$ of all vessels represented by AIS tracks, i.e., $i=\{1, \ldots, 6\}$ as for the case shown in FIG. 3. A state vector comprises the estimated object position at the image acquisition time and its uncertainty. Further, the state vector may comprise (its components may be) the time-dependent and/or time-independent attributes (as listed above) and their corresponding uncertainties. If—and which—attributes can be estimated depends on the content of the supportive information.

The estimated state vectors are input in step 2. In step 2 the estimated state vectors are assessed with respect to requirements relating to the size and the number of the training images to be produced. State vectors, i.e., the corresponding AIS tracks, which fail this assessment are discarded and excluded from further processing. Accordingly, state vectors that pass this assessment are selected for further processing in step 3 (for example, $x_1, x_3, x_4$ FIG. 4).

In step 3, the Doppler shift in the azimuthal position direction is estimated for all selected state vectors and added to the estimated position at the image acquisition time. This yields the corrected state vectors $\tilde{x}_i$. Each corrected state vector is mapped onto the image at its corresponding geographical position, and the components of the state vector are the labels that are associated with the object (in this example, the vessel) that is expected to be seen in the image at—or near—the position given in the corrected state vector.

In step 4, a window of adjustable size is centered at each geographical position in the image that is labeled with a corrected state vector. Subsequently, each window is cut out of the original image to produce an image tile that contains the labels of one (or potentially also several) corrected state vector(s). These tiles are the "good training images" (the three images on the left side at "output" in FIG. 4) that are expected to show objects (here in this example, ships) with attributes given by the labels that are estimated or received by the imaging sensor. Analogously, in those areas in the image where there are no coincident AIS tracks, the tiling procedure cuts out tiles that are not labeled with state vectors but with the label "no object of interest" (in FIG. 4 at "output" labeled as "no ship") to signify that no object of interest is expected to be present inside this tile. These tiles are the "bad training images" (the five images on the right side at "output" in FIG. 4).

Taken together, these steps constitute an automated mechanism that converts the input data into labeled image tiles. These image tiles in turn serve as input (learning material) for training a machine learning tool. Thus, the machine learning tool can distinguish objects of interest and their properties from background or clutter in an image.

More details and aspects are mentioned in connection with the embodiments described above or below. The embodiment shown in FIG. 4 may comprise one or more optional additional features corresponding to one or more aspects mentioned in connection with the proposed concept or one or more embodiments described above (e.g., FIGS. 1-3) or below (e.g., FIG. 5).

Figure 5:
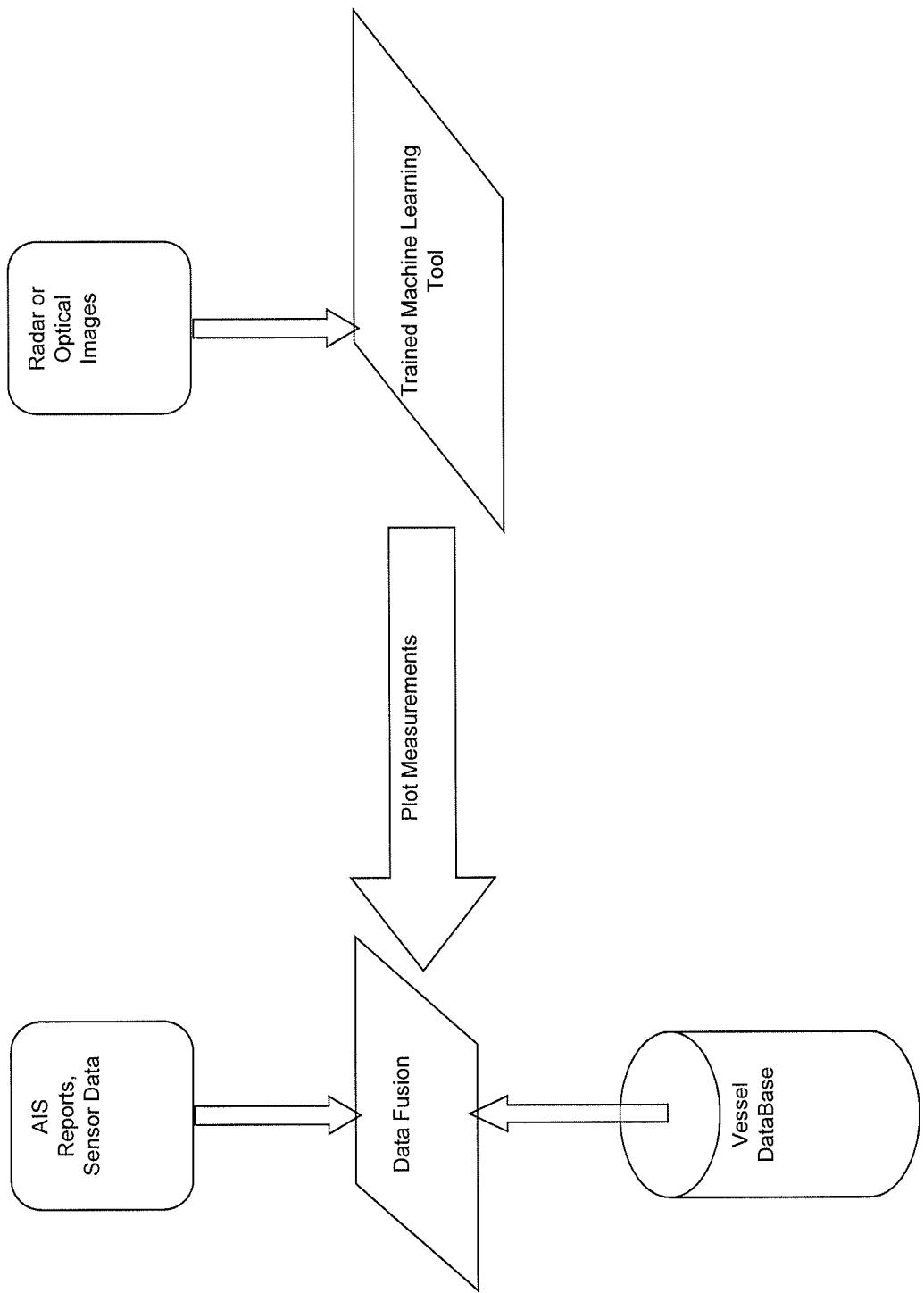
FIG. 5 schematically illustrates a flow chart of an operational phase of a trained ship classification tool in conjunction with a data fusion system.

FIG. 5 schematically illustrates a flow chart of an operational phase of a trained ship classification tool in conjunction with a data fusion system.

The present disclosure can add new capabilities to existing data fusion systems because the trained machine learning technique automatically provides "plot measurements" of the recognized objects of interest that include the position and learned properties of the detected objects. These plot measurements can be input into existing data fusion tools that combine them with other data sources (e.g., AIS messages, vessel databases) or sensor measurements in order to merge all available data into one consistent situation picture. In this way, imaging data can be fully embedded into the automated multi-source data fusion process. Further, real-time comparison of image detections with AIS updates may be possible.

More details and aspects are mentioned in connection with the embodiments described above or below. The embodiment shown in FIG. 5 may comprise one or more optional additional features corresponding to one or more aspects mentioned in connection with the proposed concept or one or more embodiments described above (e.g., FIGS. 1-4) or below.

Although surface vessels are illustrated herein as examples for illustration purposes, the described method and apparatuses are not restricted to vessels but can be applied to any type of object of interest if there is supportive information on the object that coincides in space and time with the image of the object. Other examples include automatic recognition of aircraft in images based for example on supportive ADS-B (Automatic Dependent Surveillance-Broadcast) messages.

According to an example, a method for an automated generation of training images is provided to train a machine learning software to detect and identify objects of interest and their properties in radar and optical images based on supporting information on the objects.

According to an example, a procedure or, in other words, an operational manual, is provided to automate the generation of training images for a subsequent teaching of machine learning tools to do image analysis tasks autonomously. There are several advantages of the automated generation method over semi-automated or manual methods. The automated method can generate large volumes of training images fast. The automated method may provide a configurable and reproducible procedure that can be adjusted to different requirements (concerning the size, number and quality of the training images and the generalization capability of the trained machine learning tool). Further, the automated method can be repeated many times for different input data. The automated method therefore may generate large databases of training images for various applications. The automated method can also be useful in situations where a training procedure needs to be improved or extended, which often is the case, for example, if the learned capabilities of a trained tool are to be generalized or augmented.

Furthermore, an increase of the degree of automation in the detection of an object of interest in an image and the determination of its properties may reduce the latency of the processed image data and can thus accelerate the entire processing cycle from the acquisition of the image to the delivery of the image product. In case of surface vessels, the automated method can also be applied to discriminate vessels from noise or clutter (e.g., heavy sea states, ice structures or ghost vessels) and to detect vessels that have faked their AIS reports or vessels that are not reporting through AIS at all (dark vessels) automatically and in real time.

While FIGS. 3 to 5 have been described above with reference to tiles of the image, it is also possible to apply the disclosure of FIGS. 3 to 5 to images without tiles or to a combination of tiles and the original (e.g., uncut) image (no tiles).

Figure 6:
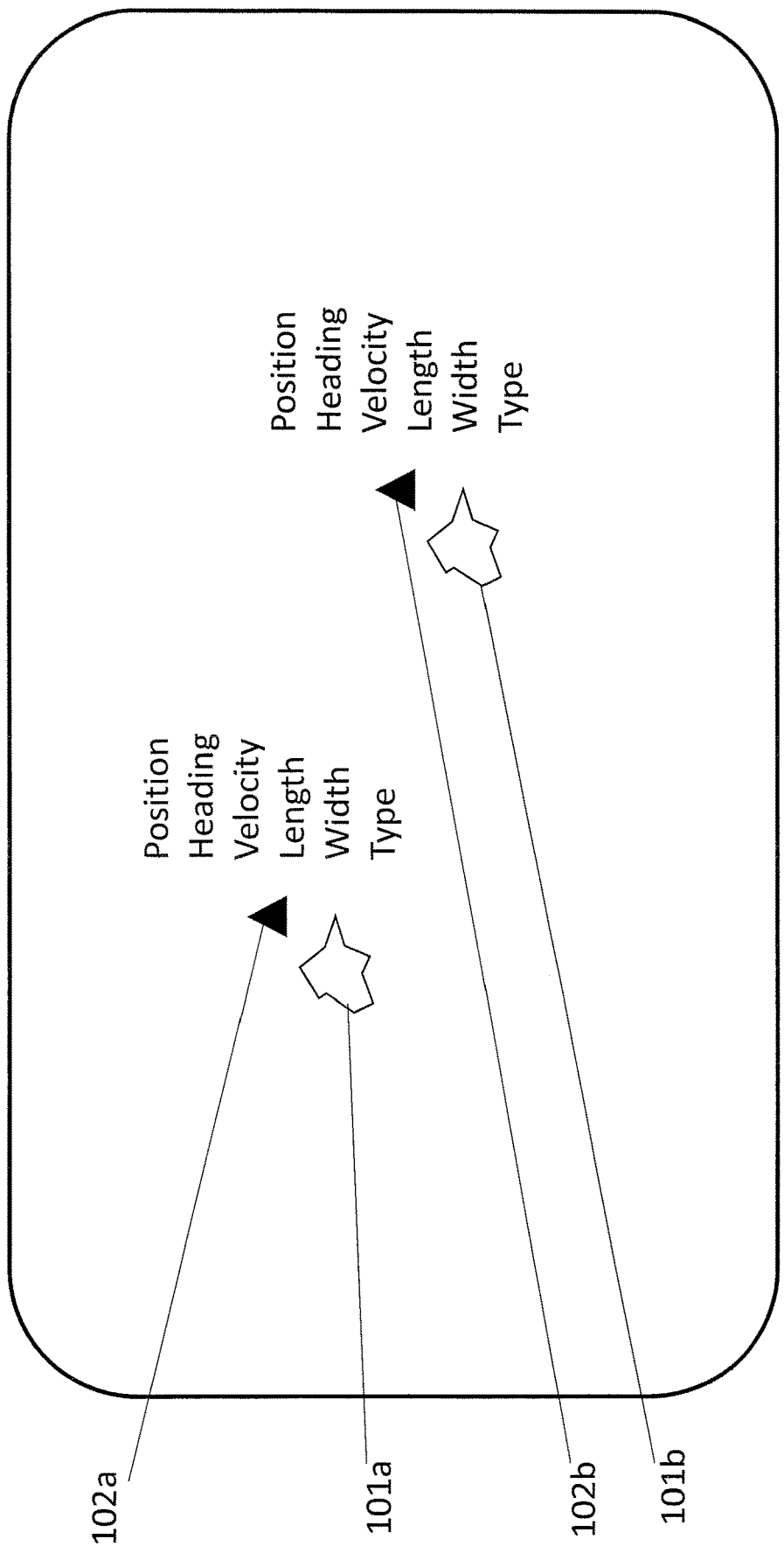
FIG. 6 schematically illustrates a radar image showing a first detected vessel 101a and its estimated position 102a and a second detected vessel 101b and its estimated position 102b, wherein the labels signify the vessels' properties at the time of the acquisition of the images.

In this respect, FIG. 6 schematically illustrates a radar image showing, as an example for an object of interest, a first detected vessel 101a and its estimated position 102a and, again as an example for an object of interest, a second detected vessel 101b and its estimated position 102b. The labels signify the vessels' properties at the time of the acquisition of the images.

As described above, given a radar or optical image, the footprint of the imaging sensor and the image acquisition time, the present disclosure aims at predicting which objects are detected in that image, where on the image they are detected and what their main properties are at the time of their detection, i.e., at the time of the acquisition of the image. For that, the present disclosure makes use of existing supportive information about an object of interest, for example a vessel that is to be detected and recognized in the image. This information may include AIS messages transmitted by the vessel and additional information retrieved from vessel databases and open source information. The combined vessel information is used to estimate as precisely as possible the position of the vessel at the time of the acquisition of the satellite image. Subsequently, the image is labeled with the estimated position and with the vessel's main attributes. For example, as a minimum, the labelling includes the information that a) a vessel is inside the imaging sensor's footprint and b) it is at the estimated position. Depending on the content of the supportive information, additional labels can include the vessel's heading, course, speed, length, width, type and corresponding uncertainties in values of these properties. A schematic example of a labeled image with two such vessels 101a, 101b is shown in FIG. 6.

In contrast to what has been described with respect to FIG. 2, after labelling, no part of the image that contains the respective estimated positions of the vessels (black triangle 102a, 102b in FIG. 6) is cut out of the image. In other words, no tiles are generated. Rather, the image is provided to a machine learning tool. The image is expected to show the vessels 101a, 101b with the labeled properties as shown by way of example in FIG. 6. Further, surrounding areas of the image that are not expected to contain vessels may also be part of the image and be provided to the machine learning tool as part of the image.

That is, according to the solution described with respect to FIG. 6, the whole image shown in FIG. 6 is used. According to a first possible realization, the whole, uncut image is used for labeling. That is, objects of interest, e.g., vessels 101a, 101b, are labeled with their respective properties including their position. In FIG. 6, the foregoing is shown, by way of example, for two vessels 101a, 101b.

According to a second possible realization, certain parts of the image, such as the edges, are clipped and the clipped image is used further. The clipped image still contains all essential information such as the vessels 101a, 101b. The second possible realization may be advantageous in situations in which only a small portion of the image shows important information such as vessels. For example, in case only one or two vessels 101a, 101b are shown on the image, the edges of the image may be clipped, while the clipped image will still show the one or two vessels 101a, 101b. The edges only contain non-essential or unimportant information and may thus be clipped without loss of important information. The clipped image will then not exactly correspond to the original image but may correspond to an essential part or big portion thereof.

FIG. 7 schematically illustrates a radar image showing a first detected vessel 101a and its estimated position 102a and a second detected vessel 101b and its estimated position 102b. The labels signify the vessels' properties at the time of the acquisition of the images.

The situation shown in FIG. 7 might be regarded as a combination of what has been described in FIG. 2 on the one hand, i.e., tiling, and FIG. 6 on the other hand, no tiling. That is, the upper image of FIG. 7 shows the image of FIG. 6, i.e., either the original (satellite) image or the clipped image (the original image with clipped edges). The lower three images in FIG. 7 illustrate parts of the image that can be regarded as tiles. The tiles have been cut out of the original image. The tiles can either contain important information (like the left tile) or background information (like the two tiles on the right). The object of interest in the left tile is shown with annotations/labels. This tile can be considered a "good training image" as described with respect to FIGS. 2 to 5. The two tiles on the right only show background information but can also contain annotations such an annotation that no vessel is shown in the tile, e.g., "no ship" as shown in FIG. 7. These tiles can be considered "bad training images" as described with respect to FIGS. 2 to 5.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F) PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

The present disclosure is not limited in any way to the embodiments described above. On the contrary, there are many possibilities for modifications thereof, which are apparent to an average skilled person without departing from the underlying idea of the present disclosure as defined in the appended claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for providing training images, the method comprising:
    receiving information about objects, wherein the information is at least valid at a specific recording time;
    receiving an image of an area, wherein the area is imaged at the specific recording time;
    estimating respective positions of the objects at the specific recording time based on the information;
    selecting estimated positions of respective objects from the estimated respective positions which fulfill a predefined selection criterion, wherein the predefined selection criterion comprises an error probability of the estimated positions of respective objects in the received image of the area at the specific recording time;
    generating training images by separating the imaged area into a first plurality of image tiles and a second plurality of image tiles, wherein each of the first plurality of image tiles differs from each of the second plurality of image tiles, and wherein each of the first plurality of image tiles images a respective one or several of the selected positions; and
    providing the training images.

2. The method according to claim 1, wherein the positions of the objects to be estimated are within the area at the specific recording time.

3. The method according to claim 1, wherein each of the first plurality of image tiles images one or several of the selected positions.

4. The method according to claim 1, wherein the image tiles of the second plurality of image tiles differ among each other.

5. The method according to claim 1, wherein the image tiles of the first plurality differ among each other.

6. The method according to claim 1, wherein the information comprises time dependent information about the objects.

7. The method according to claim 1, wherein the information comprises time independent information about the objects.

8. The method according to claim 1, wherein the information is transmitted by the objects.

9. The method according to claim 1, wherein the information comprises information about geographic coordinates, and wherein the method further comprises georeferencing the imaged area according to the information about the geographic coordinates.

10. The method according to claim 1, wherein the image tiles of the second plurality of image tiles image a part of the imaged area that does not contain an object of interest.

11. A non-transitory computer readable recording medium storing a training image provided by the method according to claim 1, wherein the training image is an input to train machine learning for an image analysis system.

12. The non-transitory computer readable recording medium according to claim 11,
wherein the training images are separated into a first plurality of image tiles and a second plurality of image tiles,
wherein each of the first plurality of image tiles comprises a respective state vector, and
wherein components of the respective state vectors are associated with an object to be present in the respective image tile.

13. The non-transitory computer readable recording medium according to claim 12, wherein each of the second plurality of image tiles are labelled with the information that no object is present in the respective image tile.

14. A device for providing training images, the device comprising:
a first receiving unit configured to receive information about objects, wherein the information is at least valid at a specific recording time;
a second receiving unit configured to receive an image of an area, wherein the area is imaged at the specific recording time;
a processing unit configured to estimate respective positions of the objects at the specific recording time based on the information, wherein the processing unit is further configured to select estimated positions of respective objects from the estimated respective positions which fulfill a predefined selection criterion, wherein the predefined selection criterion comprises an error probability of the estimated positions of respective objects in the received image of the area at the specific recording time, and wherein the processing unit is further configured to generate training images by separating the imaged area into a first plurality of image tiles and a second plurality of image tiles, wherein each of the first plurality of image tiles differs from each of the second plurality of image tiles, and wherein each of the first plurality of image tiles images a respective one or several of the selected positions; and
a transmitting unit configured to provide the training images.

15. A method for generating training images automatically, the method comprising:
receiving information about objects, wherein the information is at least valid at a specific recording time, wherein the information is transmitted by the objects, and wherein the information comprises time dependent information about the objects;
receiving an image of an area, wherein the area is imaged at the specific recording time;
estimating respective positions of the objects at the specific recording time based on the information;
selecting estimated positions of respective objects from the estimated respective positions which fulfill a predefined selection criterion, wherein the criterion comprises an error probability of the estimated positions of respective objects in the received image of the area at the specific recording time;
labelling the received image with at least one characteristic of a background of the received image and a Doppler shift of the objects as a state vector with labels that are associated with each object;
aligning the received image of the area with the estimated positions of the respective objects;
generating training images by separating the imaged area into a first plurality of image tiles and a second plurality of image tiles, wherein each of the first plurality of image tiles differs from each of the second plurality of image tiles, wherein each of the first plurality of image tiles images a respective one or several of the selected positions, and wherein each of the first plurality of image tiles is separated from the imaged area based on each of the first plurality of image tiles comprising estimated positions of the respective objects; and
providing the training images, wherein the training images comprise the first plurality of image tiles and the second plurality of image tiles, wherein the generated training images are provided automatically as an input for a subsequent training of a machine learning tool, the machine learning tool configured to be used for detecting and identifying objects of interest in images autonomously.

* * * * *